United States Patent [19]
Arvidsson et al.

[11] Patent Number: 5,251,664
[45] Date of Patent: Oct. 12, 1993

[54] QUIET CHECK VALVE FOR PULSATING FLOW

[75] Inventors: Hans Arvidsson, Trollhättan; Gert Bjerendal, Sjuntorp, both of Sweden

[73] Assignee: SAAB Automobile Aktiebolag, Sweden

[21] Appl. No.: 934,468
[22] PCT Filed: Feb. 19, 1991
[86] PCT No.: PCT/SE91/00123
 § 371 Date: Sep. 11, 1992
 § 102(e) Date: Sep. 11, 1992
[87] PCT Pub. No.: WO91/12450
 PCT Pub. Date: Aug. 22, 1991

[30] Foreign Application Priority Data

Feb. 19, 1990 [SE] Sweden .................. 9000602

[51] Int. Cl.⁵ .................................. F16K 15/06
[52] U.S. Cl. .................. 137/514; 137/469; 137/539.5
[58] Field of Search .............. 137/514, 514.5, 539.5, 137/469

[56] References Cited

U.S. PATENT DOCUMENTS

| | | | |
|---|---|---|---|
| 177,564 | 5/1876 | Rudd | 137/469 |
| 2,440,027 | 4/1948 | Stoyke | 137/514.5 |
| 2,804,825 | 9/1957 | Mansfield | 137/514 X |
| 2,860,662 | 11/1958 | Gres | 137/469 |
| 3,055,388 | 9/1962 | Tebb | 137/469 |
| 3,532,115 | 10/1970 | Hodil, Jr. | 137/516.25 |
| 3,735,777 | 5/1973 | Katzer et al. | 137/514.5 |
| 3,782,412 | 1/1974 | Darash | 137/514 |
| 4,446,886 | 5/1984 | Taylor et al. | 137/516.29 |
| 4,566,486 | 1/1986 | Taylor | 137/469 |

FOREIGN PATENT DOCUMENTS 3612393 10/1987 Fed. Rep. of Germany .
0139389 3/1953 Sweden .

OTHER PUBLICATIONS

Derwent Patent Abstract for U.S. Patent No. 4,964,391; Oct. 1990.

*Primary Examiner*—Robert G. Nilson
*Attorney, Agent, or Firm*—Ostrolenk, Faber, Gerb & Soffen

[57] ABSTRACT

A check valve (4) with spherical, spring-loaded valve head (25) is used for pulsating flows, especially in a fuel injection system for Otto engines. As a result of low flow resistance, such check valves have had a tendency to cause noise when the valve head (25) strikes down against the valve seat (11) during pulsating of the flow caused by selective opening of the fuel injection nozzles. The valve head (25) is designed with a flange (7) downstream of the valve seat (11), and this flange (7) interacts with a narrow boring (13) during the first part of the opening stroke. Consequently, a secondary throttling (12) is formed, in addition to the primary throttling between the valve head (25) and the valve seat (11), which contributes to the valve head being forced away at a distance from the valve seat. During the movement of the valve head towards the seat, the flange first comes down into the boring (13), as a result of which the continued movement of the valve head towards the seat is damped by the volume of fluid which lies between flange (7) and seat (11), as a result of which noise is prevented from occurring.

18 Claims, 2 Drawing Sheets

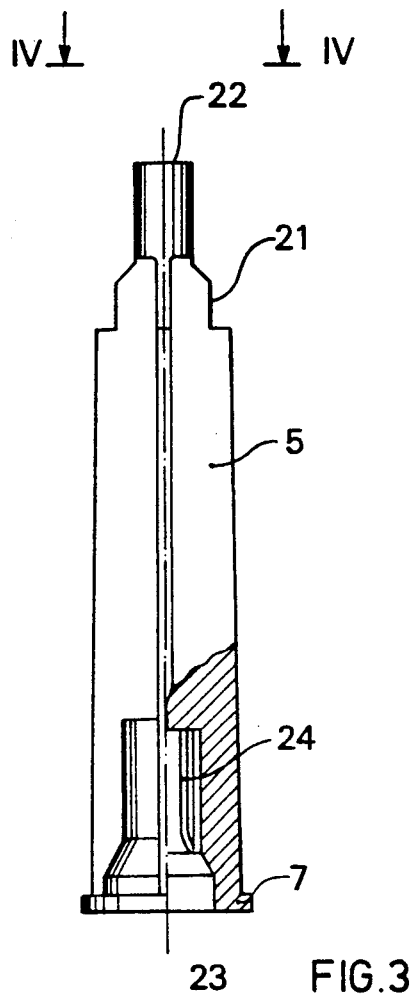
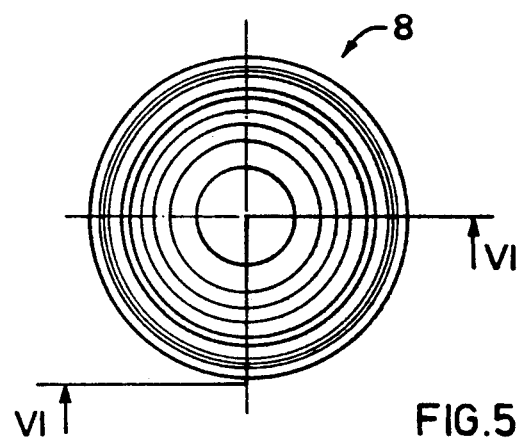
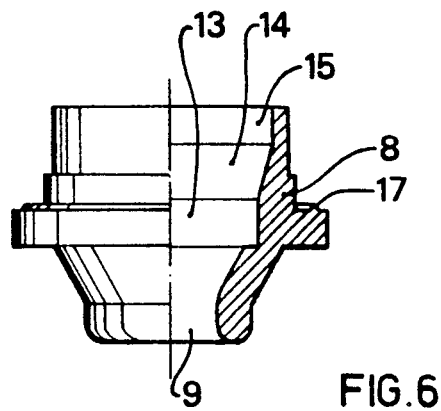
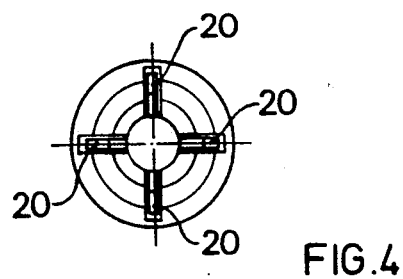
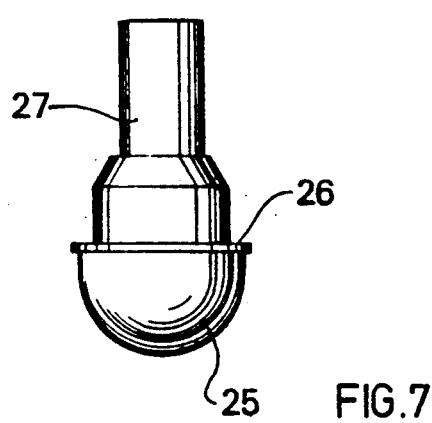

QUIET CHECK VALVE FOR PULSATING FLOW

The invention relates to a check valve with means that quiet noise that might be generated by a pulsating flow past the valve.

State of the Art

A check valve has a valve head which is urged against a valve seat by a spring. The known valve head is spherical. A flange across the path of flow is formed downstream of the valve head. There are a large number of solutions for preventing noise when valve heads in check valves or cock-operated valves close against a valve seat.

In Swedish patent SE,C, 139 389, a solution is disclosed for preventing the thin film of liquid, which passes between the valve head and the seat in an almost closed position, from causing a whistling noise. By virtue of the fact that the throughflow channel, upstream of the valve seat, is designed with axially running grooves in the channel wall, disintegration of the film of liquid is brought about before it passes the valve head. Consequently, the valve head can be kept in a minimal opening position without a passing film of liquid causing a whistling noise.

In American patent U.S. Pat. No. 3,735,777, progressive throttling of the flow in a check valve is brought about when the flow exceeds a given value. Downstream of the ordinary check valve seat, there is in this case a second valve seat, against which the valve head closes, counter to the action of a check valve spring, when the flow becomes too great. By virtue of the fact that the channel walls taper towards this second seat and are formed with grooves running in the direction of flow with decreasing flow cross-section, progressive throttling is brought about. This damps the speed of the valve head towards the closing position so that a fully developed flow is not closed off abruptly.

A solution for preventing clattering check valves is shown in American patent U.S. Pat. No. 3,782,412. In this case, a cylindrical valve head runs in a narrow circular throughflow channel so that only a narrow gap is formed between the valve head and the channel. By virtue of the fact that the cylindrical valve head is plane-machined on its outer surface in only three places of four generatrices distributed evenly over the circumference, a lateral force is brought about on the valve head towards the channel wall in the event of developed flow. Consequently, the valve head adheres against the wall so that small flow fluctuations do not cause the valve head to strike down against the valve seat.

A check valve which to a certain extent reduces the noise which is brought about when the check valve strikes against the seat is shown in American patent U.S. Pat. No. 3,532,115. In this case, the valve head has a first sealing body in the form of a rounded elastic valve head which allows deformation of the valve head until a more rigid collar downstream on the valve head comes into contact around the valve seat.

Another check valve, which in the first instance is intended for intermittent flow with short opening times of high frequency, is shown in German Patent Application DE,A,36 12 393. In order to give the valve head improved control in the throughflow channel so that the valve head is centred against the seat in the sealing position, the valve head is in this case designed with recesses, evenly distributed around the circumference, upstream of the parts on the valve head which come into contact against the seat.

The previously known check valves do not, however, have any constructive measures for damping the movement of the valve head down towards the seat apart from the damping which is afforded by the throttling between the valve head and the seat. As the valve head of a check valve is conventionally designed as a sphere or hemisphere in order to reduce the flow resistance over the check valve, this means that a small flow fluctuation can cause a rapid movement of the valve head towards the seat. The valve head can to a certain extent be made elastic and shock-absorbing, but such a design does not reduce the speed of the valve head upon movement towards the seat, as a result of which noise can still arise. For example, in check valves in injection systems for petrol engines, the valve head must be resistant to petrol, which means that relatively rigid rubber material must be used in the first instance. This rigid rubber material affords good sealing but, as far as noise generation is concerned in the event of striking against the valve seat, the noise reduction is small.

OBJECT OF THE INVENTION

The object of the present invention is to provide an improved quiet check valve with low pressure drop, which is suitable for pulsating flow, especially as a check valve in an injection system for fuel for Otto engines. These injection systems often include a check valve which is to ensure that the fuel is retained in the pipes and is not drained back to the fuel tank when the engine is switched off. If in this connection the check valve has a ball-shaped or spherical valve head which affords low pressure drop and has a characteristic which affords rapid response to the flow and its fluctuations, the valve head of the check valve comes to strike back against the valve seat at high speed and cause the valve head to end up in a state of self-oscillation. This self-oscillation is evident in the idle speed of the combustion engine, and lies around 1000 Hertz depending on the spring characteristic of the check valve.

For the purpose of solving these problems, the check valve according to the invention has a valve body with a channel in it which is defined by a wall around the flange that is downstream of the valve head, and the wall is shaped and sized to form a throttling gap between the outer edge of the flange and the channel wall. The channel wall is shaped around the flange over the path of the valve head so that the gap has a first flow area during one part of the opening stroke of the valve head and an increasing flow area during a later part of the opening stroke.

The invention results in the valve head being forced, with developed flow, to take up a position at a distance from the valve seat and, with developed flow, a volume of fluid between the flange and the valve seat being used as damping fluid for the movement of the valve head towards the valve seat. Consequently, the spherical valve head can lie and self-oscillate on a distance from the valve seat without causing noise.

Embodiments of the invention are indicated, which have proved to be particularly advantageous. These include the throttling gap being symmetric around the flange and the valve head and include particular dimensions and flow characteristics of the throttling gap. Other features and advantages of the invention emerge from the attached description of an exemplary embodi-

BRIEF DESCRIPTION OF THE FIGURES

FIG. 3 shows a check valve structure, which forms part of the check valve, in partial cross-section, FIG. 4 shows the check valve structure in FIG. 3 seen in the view IV—IV, FIG. 5 shows the valve seat structure in FIG. 2 seen from above, FIG. 6 shows the valve seat structure in FIG. 5 in the cross-section VI—VI, and FIG. 7 shows the valve head.

DESCRIPTION OF AN EXEMPLARY EMBODIMENT

Figure 1:
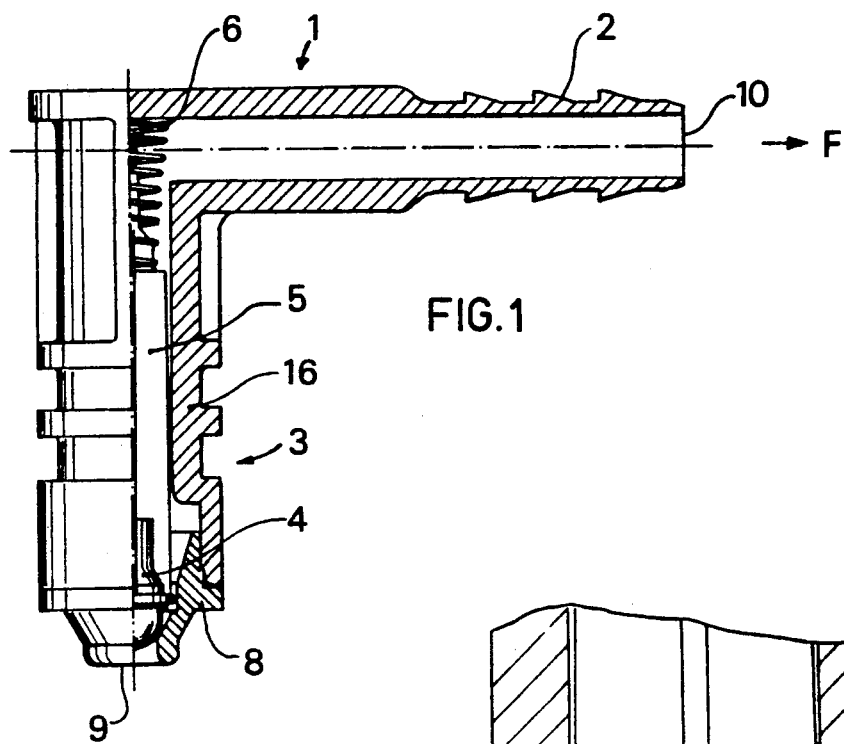
FIG. 1 shows a complete check valve in partial cross-section.

FIG. 1 shows a complete check valve arranged in a coupling nipple 1 which is intended to be coupled to a fuel pump (not shown) by means of the coupling part 3. Also connected to the nipple 1, by means of threading onto the coupling part 2, is a fuel pipe (not shown) for a combustion engine. The pump is to suck fuel from a fuel tank and pressurise the pipes of the fuel system with the fuel. In order that the fuel will not drain back to the fuel tank after the pump has been switched off, the coupling nipple includes an integrated check valve 4. This has the purpose of retaining the fuel in the fuel pipes so that the engine can be restarted immediately after the engine/pump has been switched off and that the formation of air bubbles in the pipes of the fuel system is prevented.

Injection systems for Otto engines are preferably adapted for injection overpressure of 2.5-3.0 bar, and, if a check valve with low pressure drop is used, a weaker and cheaper pump can be used. If spherical or ball-shaped valve heads are used in the check valve, a check valve with low pressure drop is obtained, but which instead in these circumstances displays great instability in the developed flow. As, moreover, the flow is subjected to fluctuations on the one hand from the pump element of the fuel pump and on the other hand from sequential opening of the injection nozzles, the instability of the valve head is further influenced. The fuel pump can be a gear pump which is driven by an electric motor. With an operating speed of the pump of around 6000 rpm during idle running of the combustion engine and with 11 pump elements in the pump, the flow is thus imparted a pulsation of fully 1000 Hertz. Moreover, the superimposed pulsation from the sequential opening of the fuel injection nozzles is received.

The housing 16 of the coupling nipple, and thus of the check valve, is preferably manufactured in one single piece, for fuel systems expediently of POM (polyoximethylen) plastic. By virtue of the fact that the nipple is angled, a spring-loaded 6 check valve 4 can simply be mounted through the inlet before an insert 8, which forms the valve seat towards the inlet, is fastened. The valve seat structure 8 can preferably also be manufactured from POM plastic. The valve head 25 itself consists of a rubber valve head 25 which, via a distance element 5, is acted upon by a coil spring 6 towards a valve seat 11 formed on the valve seat structure 8 and counter to the direction of flow F. Consequently, the fuel can be pumped into the inlet 9 and, counter to the action of the check valve 4, reach the outlet 10 and, in the event of reversed flow, block the check valve 4 against the valve seat 11.

The distance element 5, which is shown in FIGS. 3 and 4, is designed in its lower part with a mounting recess 23 adapted to the valve head 25. The valve head 25 (FIG. 7), which is manufactured from a fuel-resistant rubber material, is formed with a coupling part 27 which, by means of a press fit, is pushed firmly into the mounting recess 23. For improved retention of the coupling part 27 of the valve head in the mounting recess 23, the recess 23 can be designed with gripping flanges 24 which project radially into the recess and grip into the coupling part 27 of the rubber valve head. For interaction with the check valve spring 6, the upper part of the distance element 5 is designed, on its cross-shaped structure, with a shoulder 21 for centring and control of the coil spring 6. In order to prevent bottoming of the spring in the event of compression, the upper part of the distance element is extended so that a stop shoulder 22 is formed.

Figure 2:
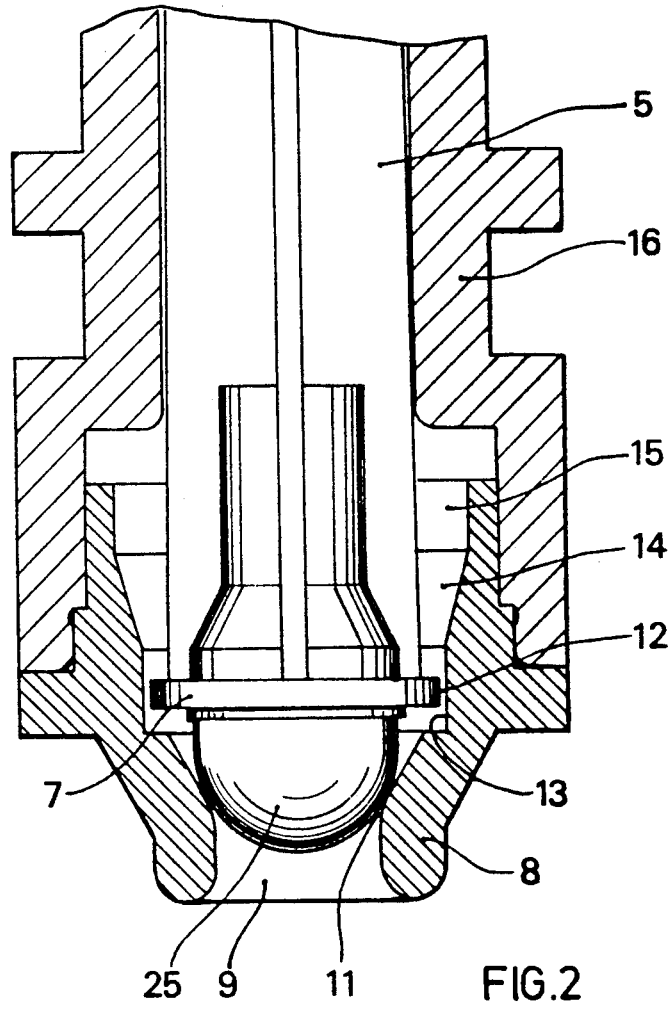
FIG. 2 shows the lower part of the check valve in cross-section with an alternative check valve seat.

According to the present invention, the check valve 4 is designed with a washer or radially projecting flange 7 between the valve head 25 itself and the distance element 5. A part of the flange 7, projecting radially in relation to the valve head, contributes then with an increase in the area facing the flow of over 100 percent. By virtue of the fact that the throughflow channel is formed with a first boring 13, situated downstream of the valve seat, at the height of the flange 7 in a closed position, which is adapted in such a manner that its diameter exceeds the flange diameter by a few percent, a second throttling 12 is formed in addition to the throttling between the valve head 25 itself and the valve seat 11. This throttling 12 has a constant throughflow area in a first part of the opening stroke of the check valve 4, followed by a gradually increasing throughflow zone 14 during a second part of the stroke. The gradually increasing throughflow zone 14 increases the throughflow area so that, in a third and final part of the stroke, a throughflow area corresponding to or exceeding the inlet area of the inlet 9 of the check valve 4 is obtained. The gradually increasing throughflow zone 14 can either be terminated at opposite ends if the zone in a rear edge, in the direction of flow, on the valve seat structure 8, shown in FIG. 1, or merge into a constant throughflow zone 15 in the valve seat structure 8, shown in FIG. 2.

In a preferred exemplary embodiment with a nominal developed flow of between 120 and 150 liters per hour, the components which are critical for the invention have the following dimensions:

valve head diameter: 5 millimeters
flange diameter: 7.2 millimeters
inlet diameter: 4 millimeters
first boring diameter: 7.4 millimeters
gradual increase to diameter: 8.8 millimeters.

These values mean that the second throttling between the flange 7 and the first boring 13 amounts to 17 percent of the inlet diameter and that the gap in the throttling is 0.1 millimeters wide during the first part of the stroke of the check valve. A part of the way into the second part of the stroke, the same throughflow area is obtained as at the inlet, after which during the third part of the stroke to the end an increase of 60 percent is achieved in the throughflow area. In an operating case for a fuel injection system, in which the flow amounts to 130 liters/hour and in which the pressure drop over a fully opened check valve amounts to 0.2 bar, a check valve with a flange diameter of only 7.0 millimeters and other dimensions as above immediately makes the striking noises typical for check valves when the valve head bounces against the seat. An increase of the flange diameter to 7.1 millimeters means that the noise begins to decrease while a flange diameter of the preferred 7.2 millimeters means that the check valve becomes quiet without the valve head bouncing against the seat. This shows that the constant throttling formed between the flange and the first boring during the first part of the stroke is of great importance for obtaining a quiet check valve for pulsating flow.

The area reduction in the throttling 12 relative to the inlet should preferably fall below 25 percent and/or the gap width should be less than 0.15 millimeters. The area increase as a result of the flange 7 should at the same time itself be of significant dimension, that is to say of the order of magnitude of 100 percent and expediently within the range 70–150 percent. In order that the valve head in the preferred embodiment be forced away from the seat at a safe distance, the first boring 13 interacts with the flange 7 for 20 percent of the stroke length or effective working stroke of the check valve. Depending upon the dimensions of the check valve, this interaction will take place over a part of the stroke length which is inversely proportional to the nominal developed flow through the check valve and proportional to the width of the gap. However, this interaction should take place over at least 10 percent of the working stroke of the valve head.

This interacting design of valve head, flange and valve seat means that, when the flow starts to be developed, the valve head 25 is forced to lift from the valve seat 11 to a position in which the flange lies within the gradually increasing throughflow zone 14. In the event of fully developed flow, the flange of the valve head comes to find a position of equilibrium, in which the resulting force from the pressure drop over the check valve 4 corresponds to the force from the spring 6. This position of equilibrium can arise within the gradually increasing throughflow area 14 or during the last part of the stroke in the boring 15. The spring will of course be adapted for the pressure drop which is obtained with the intended flow developed for this so that the desired position of equilibrium is obtained.

A contributory factor for the unstable check valve with spherical valve head not giving rise to noise during developed flow, when the valve head 25 and flange of the check valve are imparted a movement towards the valve seat, is that the flange then goes down into the first boring 13 and that the volume of liquid situated between the flange 7 and the valve seat 11 then functions as damping fluid. This volume of liquid then forms a damping cushion which cushions the movement of the valve head 25 towards the seat 11 while the remaining flow which passes the throttling channel 12 is sufficient to hold the valve head 25 from the seat 11.

By means of the preferred embodiment, a spherical valve head, which seals against a cone-shaped seat, is made use of with the advantages which these valves have with regard to pressure drop, response and sealing capability. By means of the check valve according to the invention, effective damping is obtained of the movement of the valve head against the valve seat and, during developed pulsating flow, the valve head lies at an adequate distance from the valve seat, so that an oscillation of the valve head caused by the flow pulsation does not lead to noise.

Merely a spherical valve head interacting with the channel walls does not afford an equally great safety margin against the occurrence of noise as the valve head 25 and flange 7 which form the subject of the invention. This is because merely a sphere has such low flow resistance that a small negative flow fluctuation immediately imparts to the spring-loaded valve head 25 a movement towards the seat which leads to striking through against the seat. In the deliberate design of the valve head 25 and the flange 7, a valve head is obtained which, in interaction with the first boring 13 of the channel wall, forms a throttling channel 12 which effectively prevents strikethrough.

In an alternative embodiment (not shown), the gradual throughflow zone 14 can, instead of a linearly increasing diameter of the channel wall, consist of recesses, running in the direction of flow and of a size which increases in the direction of flow, in a channel wall which otherwise has the same diameter as the first boring 13. These recesses are then expediently distributed symmetrically in the direction of the circumference over the channel wall so that the valve head does not come into unbalance in the transverse direction. The recesses are, however, not to begin until after the first part of the check valve stroke.

In terms of manufacturing, the check valve itself can also be given another composition than the embodiment demonstrated according to the subject of the invention. The projection forming the flange 7 on the distance element 5 can of course consist of a loose washer which during assembly is clamped firmly between distance element and valve head. The coil spring 6 acting on the check valve can also be placed alternatively between a non-movable distance element 5 which bears permanently against the inner wall of the coupling nipple and an axially movable composite valve head and washer.

The complete check valve, apart from spring 6 and valve head 25, is preferably manufactured from POM plastic. The distance element is then premounted expediently with valve head and spring, after which this can be inserted as a unit into the inlet 9. Mounting is concluded by the valve seat structure 8 being threaded into the inlet and preferably welded together with the valve housing 16 by means of ultrasonic welding. For this welding, the valve structure 8 is designed with a ridge 17 which is formed in the contact surface and is plastically deformed against the corresponding contact surface of the valve housing during welding.

We claim:

1. A check valve comprising:
   a valve body having an internal wall shaped to define a flow channel through the valve body, the flow channel having a flow inlet and a flow outlet spaced away from the inlet;
   a valve seat in the channel at the wall, the seat having an opening through it for passage of liquid past the seat;
   a valve head disposed in the channel, the valve head having a seating part of a size and shape to engage and cooperate with the valve seat for blocking return flow through the channel past the valve seat and toward the inlet, said valve head seating part being at least partly spherical where it contacts the valve seat, said valve head having an opening stroke length in the channel;

a flange on the valve head located downstream in the channel from the seating part, the flange having an outer peripheral edge toward the channel wall and the flange having a cross section in the channel out to the peripheral edge of the flange which exceeds the cross section in the channel of the seating part of the valve head;

the channel wall having a first part which is shaped to define a relatively narrower opening valve seat for contacting the seating part of the valve head;

the wall having a second part that defines a first throttling gap between the flange outer edge and the channel wall, the first throttling gap being downstream of the valve seat, the wall second part being so placed and of such a length as to extend around the valve head and around the flange as the valve head seating part shifts downstream off the valve seat or shifts upstream in the direction toward the valve seat; the second part of the channel wall being shaped and of such length that the first throttling gap has a first flow cross sectional area during a first part of the opening stroke of the valve head seating part off the valve seat and for a first distance of movement of the valve head toward the channel outlet, the first throttling gap extending along the channel over at least 10% of the opening stroke length of the valve head, the flange cooperating with the first throttling gap to prevent substantial flow when the flange is adjacent the second wall part and forcing the valve head to a safe distance from the valve seat during developed flow thereby preventing valve noise during pulsating flow;

the wall having a third part downstream in the flow direction from the second part and placed to extend around the outer edge of the flange over a second part of the opening stroke of the flange and the valve head toward the outlet, the third part of the wall defining a second throttling gap between the peripheral edge of the flange and the wall, the second throttling gap having a gradually increasing cross section of flow area in the second part of the opening stroke of the valve head and the flange away from the valve seat toward the channel outlet.

2. The check valve of claim 1, wherein the wall defines a circular cross section channel; the at least partly spherical part of the valve head has a respective first diameter, the flange is annular with a circular periphery, the flange having a greater diameter than the first diameter of the at least partly spherical part of the valve head.

3. The check valve of claim 1, wherein the valve head seating part is at least partly curved where it contacts the valve seat.

4. The check valve of claim 3, wherein the valve seat is defined in the valve body generally at the inlet to the channel.

5. The check valve of claim 3, further comprising a spring normally urging the valve head toward engagement with the valve seat.

6. The check valve of claim 3, wherein the valve seat has a gradually widening incline away from the channel inlet and toward the channel outlet, and the seating part of the valve head engages the inclined portion of the valve seat.

7. The check valve of claim 6, wherein the wall defining the channel is circular, the valve seat is uniformly shaped and annular, the valve head is so shaped and positioned and the flange is so shaped and positioned that the first and second throttling gaps are symmetrical around the flange and the valve head.

8. The check valve of claim 3, wherein the first and second throttling gaps extend along the channel over at least 10% of the stroke length of the valve head.

9. The check valve of claim 3, wherein the first and second throttling gaps extend along the channel over approximately 20% of the stroke length of the valve head.

10. The check valve of claim 3, further comprising a stop in the valve body for stopping movement of the valve head away from the valve seat, for defining the stroke length of the valve head from the valve seat, through the first and second parts of the opening stroke of the valve head, and to the stop.

11. The check valve of claim 10, wherein the first and second throttling gaps extend along the channel over at least 10% of the stroke length of the valve head.

12. The check valve of claim 11, wherein the second part of the channel wall is of constant cross-section so that the first part of the throttling gap is of a constant cross-section to provide a flow restriction past the flange such that the flow area through the first part of the throttling gap past the peripheral edge of the flange is less than 25% of the flow area through the inlet of the check valve.

13. The check valve of claim 3, wherein the second part of the channel wall is of constant cross-section so that the first part of the throttling gap is of a constant cross-section to provide a flow restriction past the flange such that the flow area through the first part of the throttling gap past the peripheral edge of the flange is less than 25% of the flow area through the inlet of the check valve.

14. The check valve of claim 3, wherein the second part of the channel wall is shaped to provide a constant flow area through the first part of the throttling gap and past the peripheral edge of the flange during the first part of the opening stroke of the valve head; and the third part of the channel wall is shaped to define a gradual increase in the flow area through the second part of the throttling gap past the flange during the second part of the opening stroke of the valve head.

15. The check valve of claim 14, wherein the third part of the channel wall is so shaped that during the second part of the opening stroke of the valve head, the second part of the throttling gap past the flange enlarges to at least 100% of the flow area of the channel inlet with the valve head off the valve seat.

16. The check valve of claim 2, wherein the flange on the valve head has a diameter which exceeds the diameter of the spherical part of the valve head by at least 30%.

17. The check valve of claim 16, wherein the flange and the wall of the channel are respectively so shaped that the first part of the throttling gap provides a flow area of less than 3 square mm for passing a nominal flow of between 100 and 150 liters per hour.

18. The check valve of claim 17, wherein the flange and the wall of the channel are respectively so shaped that in the second part of the channel, the flow area of the first part of the throttling gap is approximately 25% of the flow area of the inlet to the channel.

* * * * *